(12) United States Patent
Barnes

(10) Patent No.: US 6,389,080 B1
(45) Date of Patent: May 14, 2002

(54) RANDOM PHASE SHIFT KEYING

(75) Inventor: Vincent C. Barnes, Pleasanton, CA (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 09/265,223

(22) Filed: Mar. 6, 1999

(51) Int. Cl.$^7$ .......................... H04L 27/18; H04L 9/00; H04L 9/12

(52) U.S. Cl. ........................................ 375/269; 375/308

(58) Field of Search ................................. 375/261, 268, 375/269, 326, 376, 308, 329, 327; 332/145, 155; 380/1, 49, 279, 280, 277, 278

(56) References Cited

U.S. PATENT DOCUMENTS

| | | | | |
|---|---|---|---|---|
| 4,704,574 A | * | 11/1987 | Nossen | 324/83 |
| 5,696,795 A | * | 12/1997 | Williams et al. | 375/308 |
| 5,818,875 A | * | 10/1998 | Suzuki et al. | 375/261 |
| 5,838,797 A | * | 11/1998 | Iwasaki | 380/49 |

* cited by examiner

Primary Examiner—Chi Pham
Assistant Examiner—Dung X. Nguyen
(74) Attorney, Agent, or Firm—Kenneth W. Float

(57) ABSTRACT

Communication architectures and methods that implement random phase shift keying. A transmitter and a receiver are coupled by way of a communications channel. The transmitter uses a data source and a mapper that produces an amplitude phase keyed (APK) waveform having a plurality of symbol phases. A transmitter multiplier multiplies random phase signals with the APK waveform to produce a random phase keyed output signal. A vector modulator modulates the random phase keyed output signal. A transmitter mixer mixes the random phase keyed output signal with a local oscillator signal from a transmit local oscillator to produce a modulated carrier signal that is transmitted over the communication channel. The receiver has a demodulator including a receiver mixer that receives and mixes the received modulated carrier signal with a local oscillator signal derived from a receive local oscillator to produce an estimate of the random phase keyed signal. The estimated random phase keyed signal is synchronously sampled. A receiver multiplier multiplies a random phase signal with the estimated random phase keyed signal to produce an estimate of the APK waveform. A carrier tracking phase lock loop processes the estimated APK waveform to track the received modulated carrier signal. The present invention makes interception of standard amplitude phase keyed (APK) waveforms virtually impossible.

5 Claims, 7 Drawing Sheets

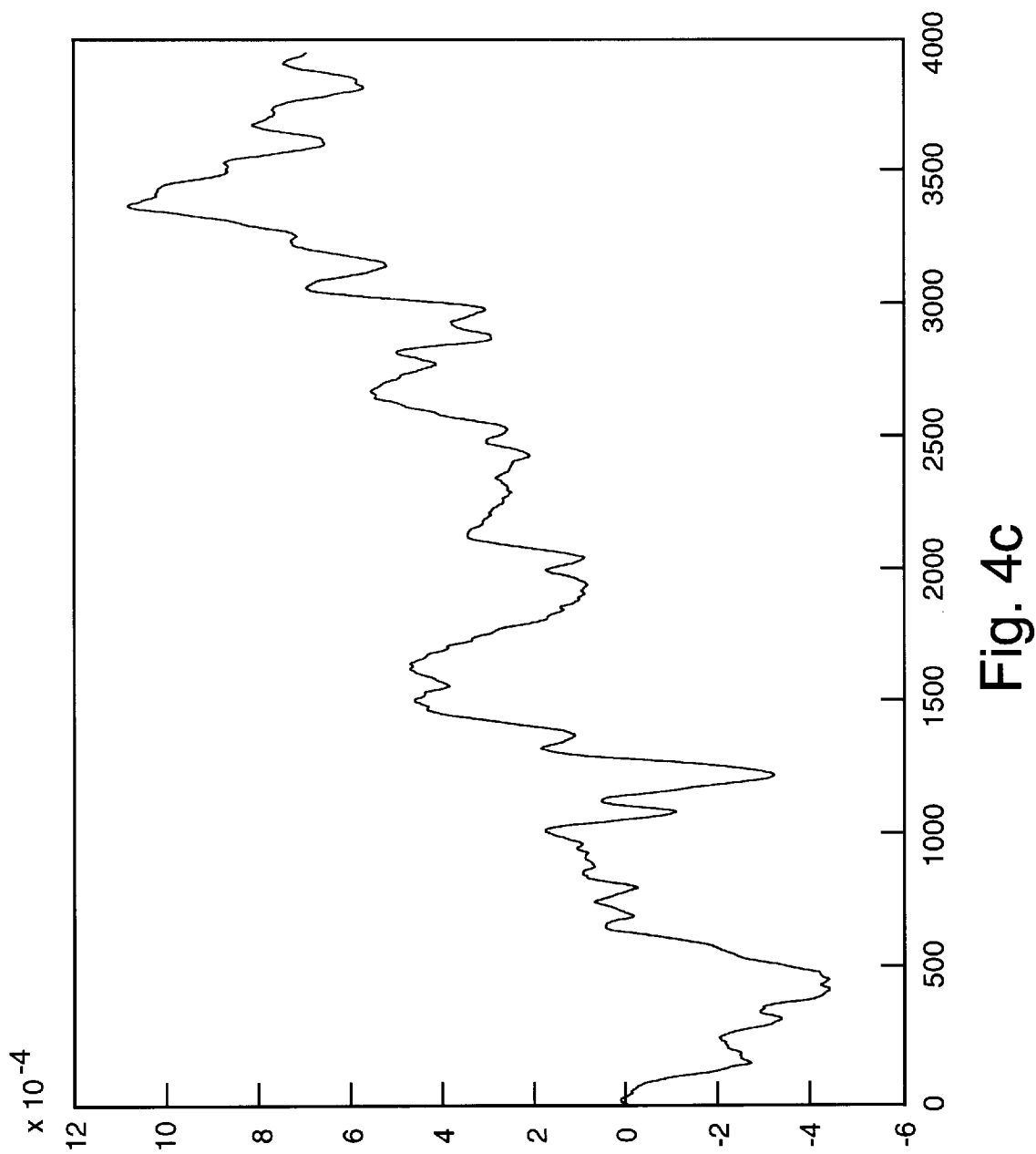

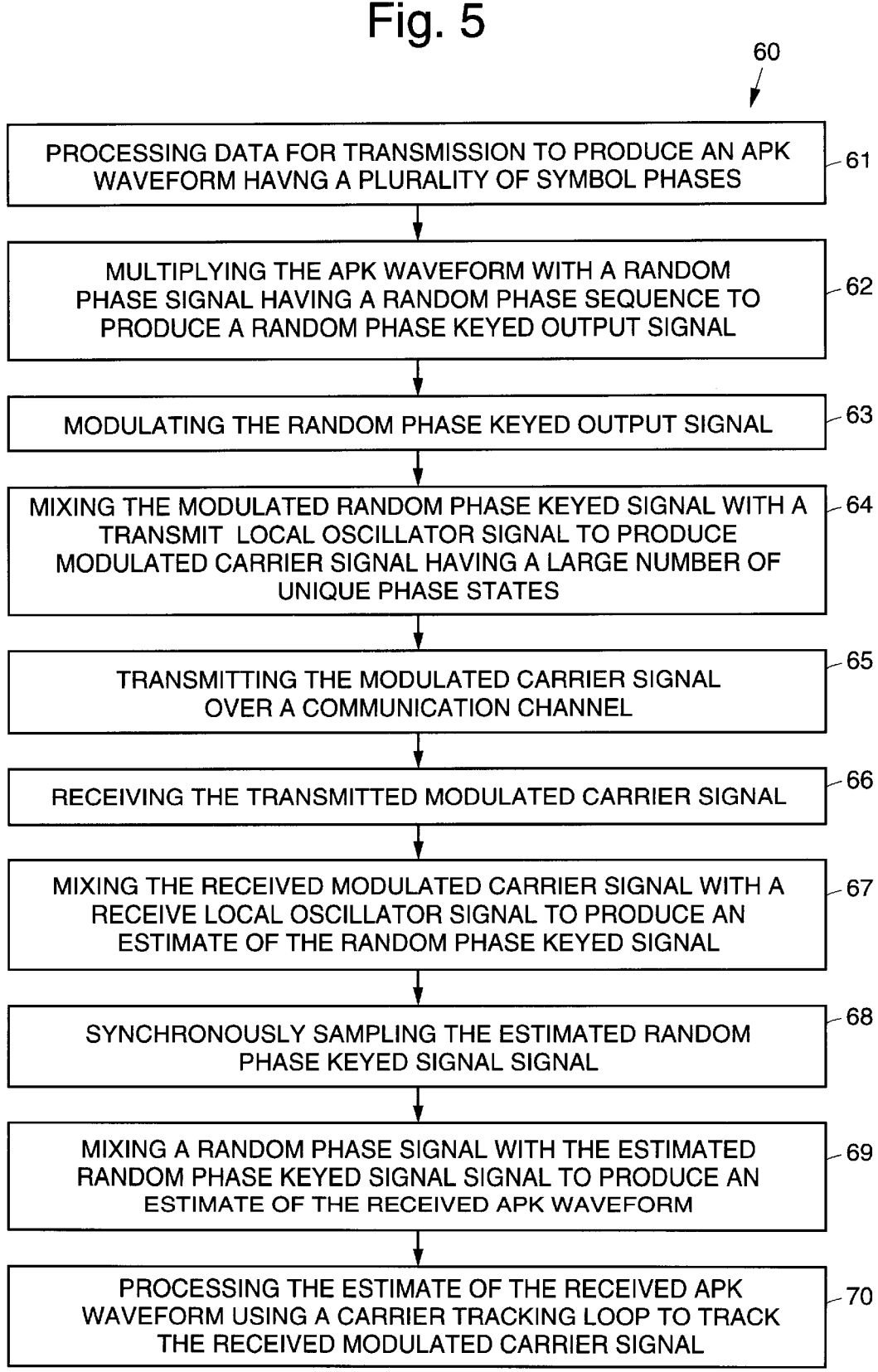

RANDOM PHASE SHIFT KEYING

BACKGROUND

The present invention relates generally to wireless data communication systems and methods, and more particularly, to a random phase shift keying technique that provides for secure modulation of wireless data communication signals.

A conventional signaling waveform for phase shift keying modulation may be expressed as $$S_i(t) = \sqrt{\frac{2E}{T}} \cos(\omega_0 t + \phi_i(t)), \quad 0 \leq t \leq T$$

$$\phi_i(t) = \frac{2\pi i}{M}, \quad i = 1 \ldots M$$

where E is the average energy in the signal, T is the duration of a pulse, $\omega_0$ is the carrier frequency, and M is the number of signaling points in the PSK constellation.

Referring to the drawing figures, the constellation for QPSK (M=4) is shown in FIGS. 1*a* and 1*b*. More specifically, FIGS. 1*a* and 1*b* show a conventional quadrature phase shift keying (QPSK) constellation.

A fundamental component in wireless communications is the ability of a receiver to "recover" the carrier, that is, to make the receive local oscillator coherent with the transmit local oscillator. The two most common classes of carrier recovery are Mth order nonlinearity and digital symbol detection.

As for Mth order nonlinearity, applying an Mth order nonlinearity to remove modulation from the incoming carrier yields the following:

$$S_i(t) = \left[\sqrt{\frac{2E}{T}} \cos\left(\omega_0 t + \frac{2\pi i}{M}\right)\right]^M$$

$$= A\cos(M\omega_0 t + 2\pi i).$$

With the modulation removed, a phase lock loop may be used to track the unmodulated carrier at M times the carrier frequency. This tracked frequency is divided by M and used for demodulation.

As for digital symbol detection, digital detection of received signaling points may be used to determine whether a point is advanced or retarded with respect to an ideal point. These early/late signals are filtered and used for carrier tracking.

Using conventional phase shift keying, an unauthorized receiver can easily recover the transmitted symbols and possibly bits. Phase randomization may be used to make accurate reception of the bits more difficult, but powerful computers can often be used to crack phase randomization codes. Therefore, phase randomization schemes are usually only computationally secure.

A computer search relating to the present invention uncovered U.S. Pat. No. 4,652,838 entitled "Phase Randomization to Reduce Detectability of Phase or Frequency-modulated Digital Signals" issued Mar. 24, 1987. This patent discloses a communications system for conveying information angle-modulated onto a carrier that includes a modulator which angle-modulates the data onto the carrier and which also randomly changes the phase of the carrier. Since the carrier phase is randomly changed, an unauthorized receiver or interceptor of the signal who frequency-multiplies the signal and integrates over a long period in order to reconstruct the carrier produces a carrier which has a broader bandwidth and relatively less amplitude than in the case in which the carrier phase is not randomly changed. The probability of intercept and demodulation by the unauthorized receiver is thereby reduced. The authorized receiver frequency-multiplies and integrates for the known frame interval to recover the carrier.

With regard to the present invention, while the general purpose of the technique disclosed in this patent is the same as the present invention, the implementation and effects are quite different. The technique disclosed in U.S. Pat. No. 4,652,838 randomizes the continuous waveforms where RPSK simply randomizes the transmitted symbols. The technique disclosed in U.S. Pat. No. 4,652,838 seems to adversely effect performance by causing bandwidth expansion where the present invention cause no bandwidth expansion. The technique disclosed in U.S. Pat. No. 4,652,838 requires TDMA type processing (i.e. higher than the symbol rate processing) whereas the present invention operates at the desired symbol rate (which lends itself to high rate applications). The technique disclosed in U.S. Pat. No. 4,652,838 caused performance degradation whereas the present invention performs theoretically identical to standard PSK or QAM modulation techniques. The present invention appears to be much simpler and more applicable to the most common forms of modulation used today than the technique disclosed in U.S. Pat. No. 4,652,838.

Accordingly, it would be an advantage to have an improved phase shift keying technique that provides for secure modulation of wireless data communication signals.

SUMMARY OF THE INVENTION

The present invention provides for a secure modulation technique based on the use of vector modulation and digital symbol recovery techniques developed by the assignee of the present invention. The present invention is referred to as random phase shift keying, and makes interception of standard amplitude phase keyed (APK) waveforms nearly impossible.

The present invention provides for communication architectures and methods that implement random phase shift keying. Exemplary communication architecture and methods include a transmitter and a receiver coupled by way of a communications channel. The transmitter comprises a data source coupled to a mapper that produces an APK waveform having a plurality of symbol phases. A transmitter multiplier multiplies random phase signals with the APK waveform to produce a random phase keyed output signal. A vector modulator modulates the random phase keyed output signal. A transmitter mixer mixes the modulated random phase keyed output signal with a local oscillator signal from a transmit local oscillator to produce a modulated carrier signal that is transmitted over the communication channel.

The receiver comprises a demodulator including a receiver mixer that receives and mixes the received modulated carrier signal with a local oscillator signal derived from a receive local oscillator to produce an estimate of the random phase keyed signal. The estimated random phase keyed signal is synchronously sampled. A receiver multiplier multiplies a random phase signal with the estimated random phase keyed signal to produce an estimate of the APK waveform. A carrier tracking phase lock loop processes the estimated APK waveform to track the received modulated carrier signal.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4c illustrates simulation results derived from the random phase shift keying architecture of FIG. 3 for VCO frequency without phase de-randomization;

FIG. 5 is a flow diagram illustrating an exemplary random phase shift keying method in accordance with the principles of the present invention.

DETAILED DESCRIPTION

The random phase shift keying technique of the present invention will be discussed in the context of phase shift keying (PSK) waveforms but may be readily used with more general amplitude phase keyed waveforms.

Random phase shift keying, described below, makes accurate reception of transmitted symbols only possible by an intended receiver. If a potential interceptor cannot receive the symbols, the computational power of the interceptor is removed as a variable in the definition of secure communications.

The present random phase shift keyed modulation technique uses a signaling waveform defined as:

$$S_i(t) = \sqrt{\frac{2E}{T}} \cos(\omega_0 t + \phi_i(t) + \Phi_i(t)), \; 0 \le t \le T$$

$$\phi_k(t) = \frac{2\pi i}{M},$$

$$\Phi_k(t) = \frac{2\pi k}{N},$$

where E is the average energy in the signal, T is the duration of a pulse, $\omega_0$ is the carrier frequency, $\phi_k(t)$ is the symbol rate, $\Phi_k(t)$ are random phase changes introduced into the signal, M is the number of signaling points in the phase shift keyed constellation, and N is the number of random phases used for transmission.

Figure 1A:
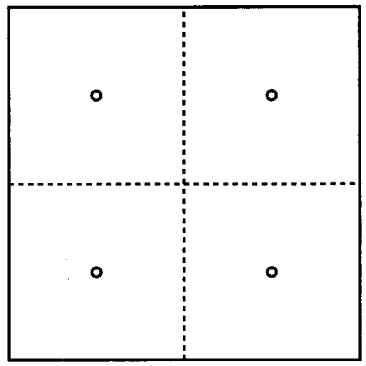
FIGS. 1a and 1b illustrates a conventional quadrature phase shift keying constellation.
Figure 1B:
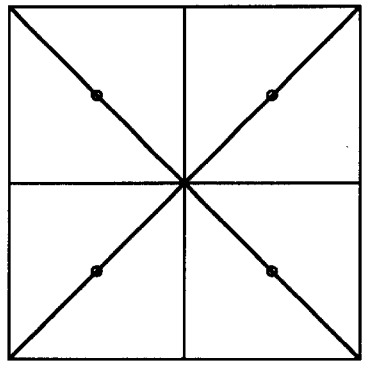
Figure 2A:
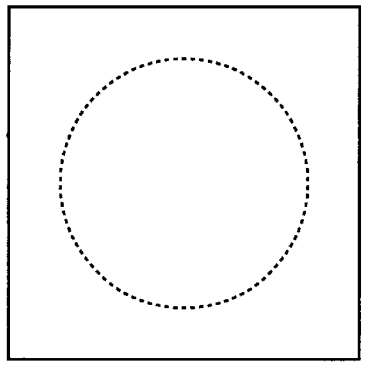
FIGS. 2a and 2b illustrate an exemplary random phase shift keying constellation in accordance with the principles of the present invention.
Figure 2B:
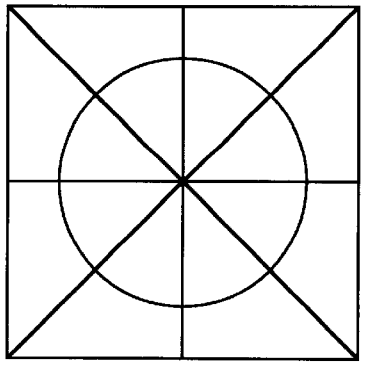

N is a definable number that determines possible phase shifts of the waveform. There is no impact to the spectral properties of the system if the random phase changes ($\Phi_k$) occur at a rate that is less than or equal to the symbol rate (i.e. the rate of change of $\phi_k$). An example of a received random phase shift keying constellation is shown in FIGS. 2a and 2b. In particular, FIGS. 2a and 2b show an exemplary random phase shift keying constellation.

It should be clear that, as N increases, an Mth order nonlinearity, or in this case and Nth order nonlinearity, is not feasible for a carrier recovery architecture. This leaves a digital recovery loop as a logical alternative carrier recovery architecture.

For a QPSK signal, a receiver without knowledge of $\Phi_k(t)$ can at best use an ideal digital symbol recovery map to determine early/late reception of the symbols. Given proper selection of N, an intercepting receiver will make an extremely large number of false detections and thus fail to maintain phase coherence.

However, a receiver that has prior knowledge of $\Phi_k(t)$ can rotate the received sample by $-\Phi_k(t)$ prior to sending the sample to the digital symbol recovery circuit. This simple modification of standard phase shift keying (amplitude phase keying) modulation results in a very robust form of secure wireless data communications.

Furthermore, if an intercepting receiver is somehow capable of achieving phase coherence without knowledge of $\Phi_k(t)$, the symbol decisions, and therefore bit decisions, will be no more accurate than making random decision (i.e. a BER 0.5).

The present random phase shift keying modulation technique "masks" the modulation order. The coherently received symbols, without knowledge of $\Phi_k(t)$, look like rings of noise giving no indication of how many bits per symbol are supported.

Figure 3:
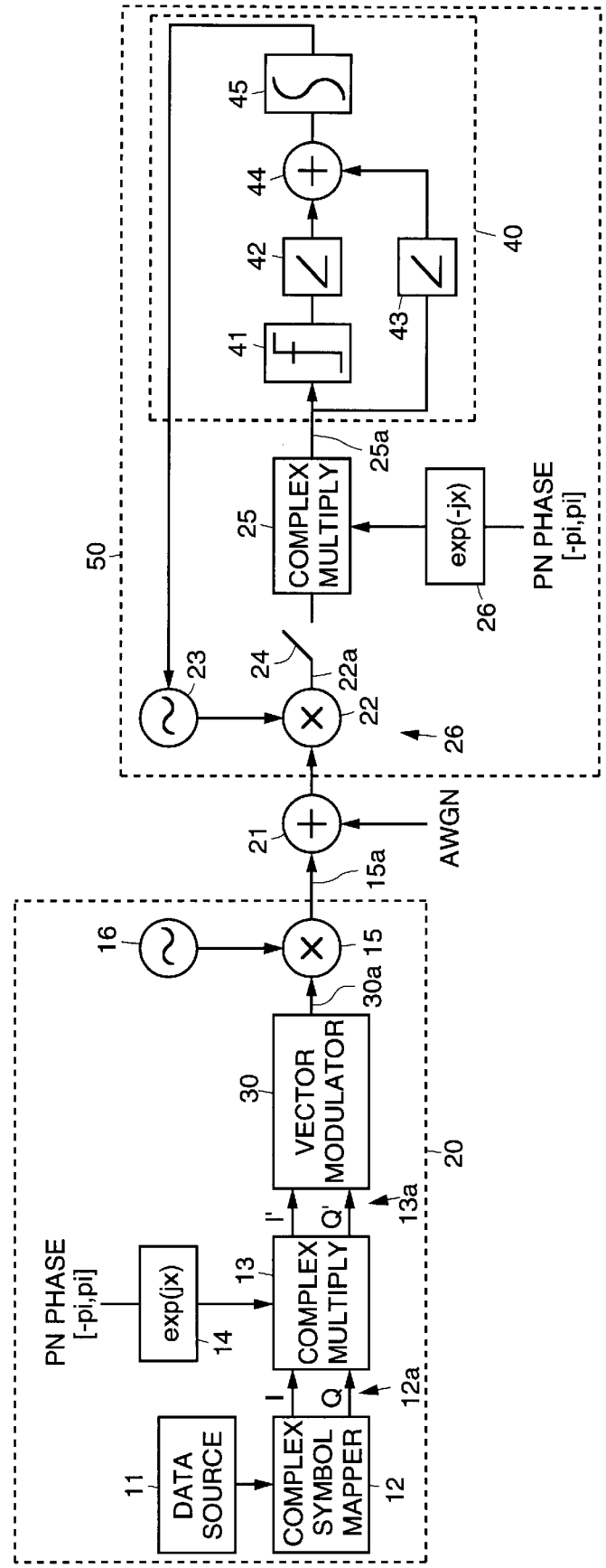
FIG. 3 is a block diagram that illustrates an exemplary communication architecture used to produce random phase shift keying in accordance with the principles of the present invention.

Implementation of the present random phase shift keying modulation technique is an extension of technology developed by the assignee of the present invention. FIG. 3 is a block diagram that illustrates an exemplary communication architecture 10 used to produce random phase shift keying in accordance with the principles of the present invention.

The exemplary communication architecture 10 comprises a transmitter 20 that produces a modulated carrier signal 15a with a large number of unique phase states. The transmitter 20 comprises a data source 11 that is coupled to a mapper 12. The data source 11 outputs binary data ("ones and zeros). The mapper 12 produces output signals 12a having a plurality of symbol phases comprising an amplitude phase keyed (APK) waveform 12a, such as a QPSK constellation or QAM constellation, for example. The data derived from the data source 11 is thus mapped to a symbol such as is shown in FIGS. 2a and 2b.

The APK waveform 12a produced by the mapper 12 is coupled to a first input of a transmitter multiplier 13. A random phase signal 14 (PN phase [-pi, pi]) having a random phase sequence is input at a second input of the transmitter multiplier 13. The transmitter multiplier 13 multiplies symbol phases of the APK waveform 12a with the random phase sequence of the random phase signal 14 to produce a random phase keyed output signal 13a.

The random phase keyed output signal 13a is coupled to a vector modulator 30 that modulates the random phase keyed output signal 13a to produce a modulated random phase keyed output signal 30a. The modulated random phase keyed output signal 30a is coupled to a first input of a transmitter mixer 15 that mixes the random phase keyed output signal 13a with a local oscillator signal derived from a transmit local oscillator 16 input at a second input of the transmitter mixer 15. This produces a modulated carrier signal 15a having a large number of unique phase states for transmission. The modulated carrier signal 15a output from the transmitter mixer 15 is transmitted over a communication channel 21, or in the simulation example shown in FIG. 3, by way of an adder 21 that sums the modulated carrier signal 15a with a additive white Gaussian noise (AWGN) signal to simulate the communication channel 21.

The modulated carrier signal 15a transmitted by way of the communication channel 21, represented by the simulated communication channel 21 shown in FIG. 3, is received by a receiver 50. The receiver 50 includes a demodulator 26 that comprises a receiver mixer 22 that mixes the received modulated carrier signal 15a (received symbol) input at a first input with a local oscillator signal derived from a receive local oscillator 23 input at a second input. The receiver mixer 22 produces an estimate of the random phase keyed signal 22a. The estimated random phase keyed signal 22a is coupled through a synchronous sampler 24 to a first input of a receiver multiplier 25. The receiver multiplier 25 multiplies a random phase signal (PN phase [−pi, pi]) input at a second input with the estimated random phase keyed signal 22a to produce an estimate of the transmitted APK waveform 25a.

The estimated APK waveform 25a is then processed by a carrier tracking phase lock loop 40 which is implemented using a digital symbol recovery circuit 40. The carrier tracking phase lock loop 40 processes the estimated APK waveform 25a to determine if the phase angle of the APK waveform leads or lags the ideal angle and outputs an output signal that drives the receive local oscillator 23 to change its oscillating frequency to accurately track the received modulated carrier signal 15a.

In the exemplary architecture 10 shown in FIG. 3, the carrier tracking phase lock loop 40 comprises a slicer 41 that makes a decision regarding the estimated APK waveform 25a as to which constellation point was received. The slicer 41 is coupled to a first angle calculator 42 that determines the estimated phase angle of the constellation point estimated by the slicer 41. The estimated APK waveform 25a is also processed by a second angle calculator 43 which determines the real phase angle of the constellation point in the estimated APK waveform 25a. The phase angles derived from the first and second angle calculators 42, 43 are compared in a comparator 44 that predicts if the estimated phase angle leads or lags the real phase angle. The output of the comparator 44 is applied to a loop filter 45 that outputs a feedback signal 45a that drives the receive local oscillator 23.

In operation, in the transmitter 20, the vector modulator 30 is used to modulate the carrier signal with a large number of unique phase states (this can be viewed as an encoder/phase randomizer). The mixing circuit (the transmitter multiplier 13) mixes the random phase sequence with the symbol phases, or a processor that supports this function in software, may be employed in conjunction with the vector modulator 30 to produce the random phase shift keyed modulated carrier signal 15a for transmission.

At the receiver 35, a circuit (the receiver mixer 22) that mixes the random phase sequence with the received symbol or a processor that supports this function in software may be employed. Synchronization of the modulation may be achieved by synchronously switching into a random mode after coherency has been established on a standard waveform.

Figure 4A:
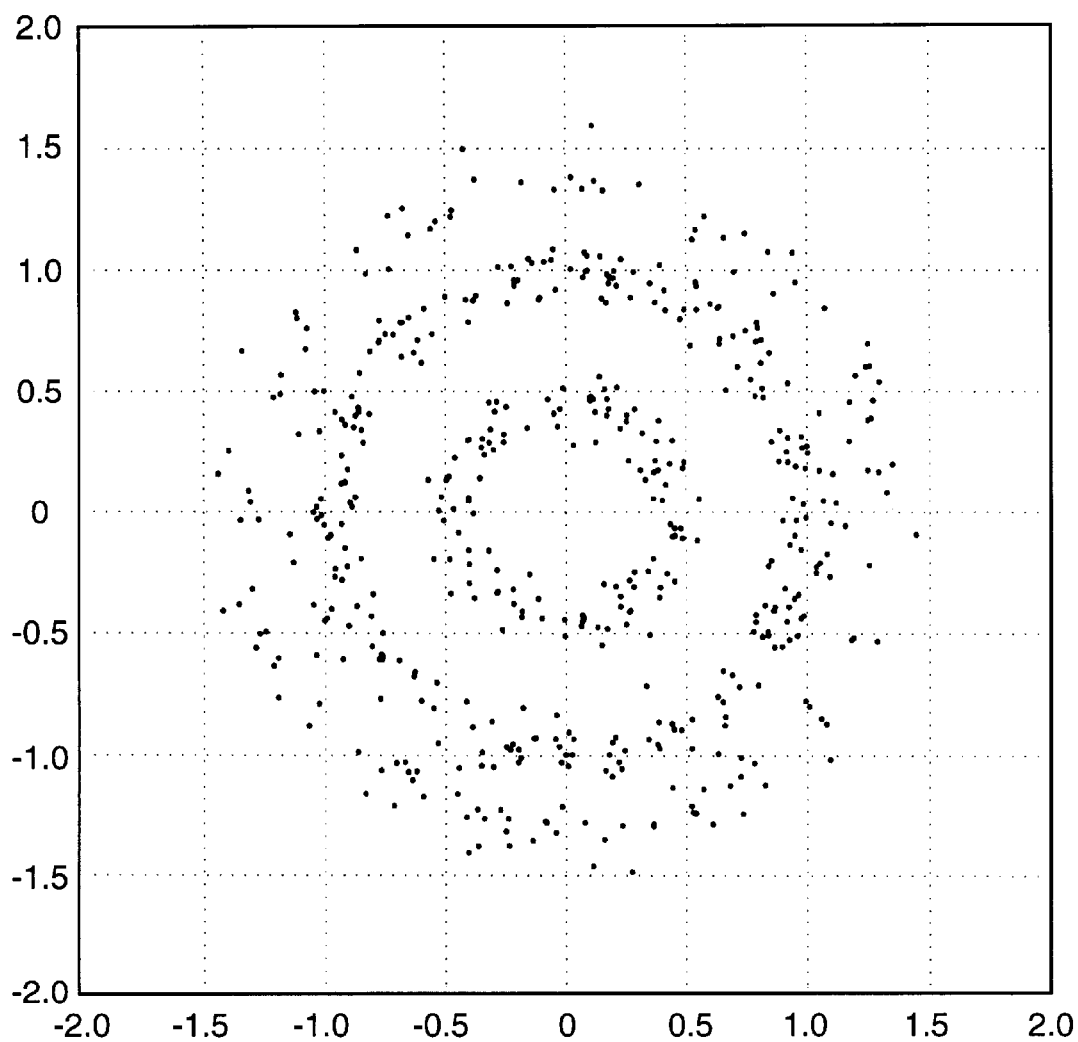
FIG. 4a illustrates simulation results derived using the random phase shift keying architecture of FIG. 3 for 16 QAM with no phase de-randomization.
Figure 4B:
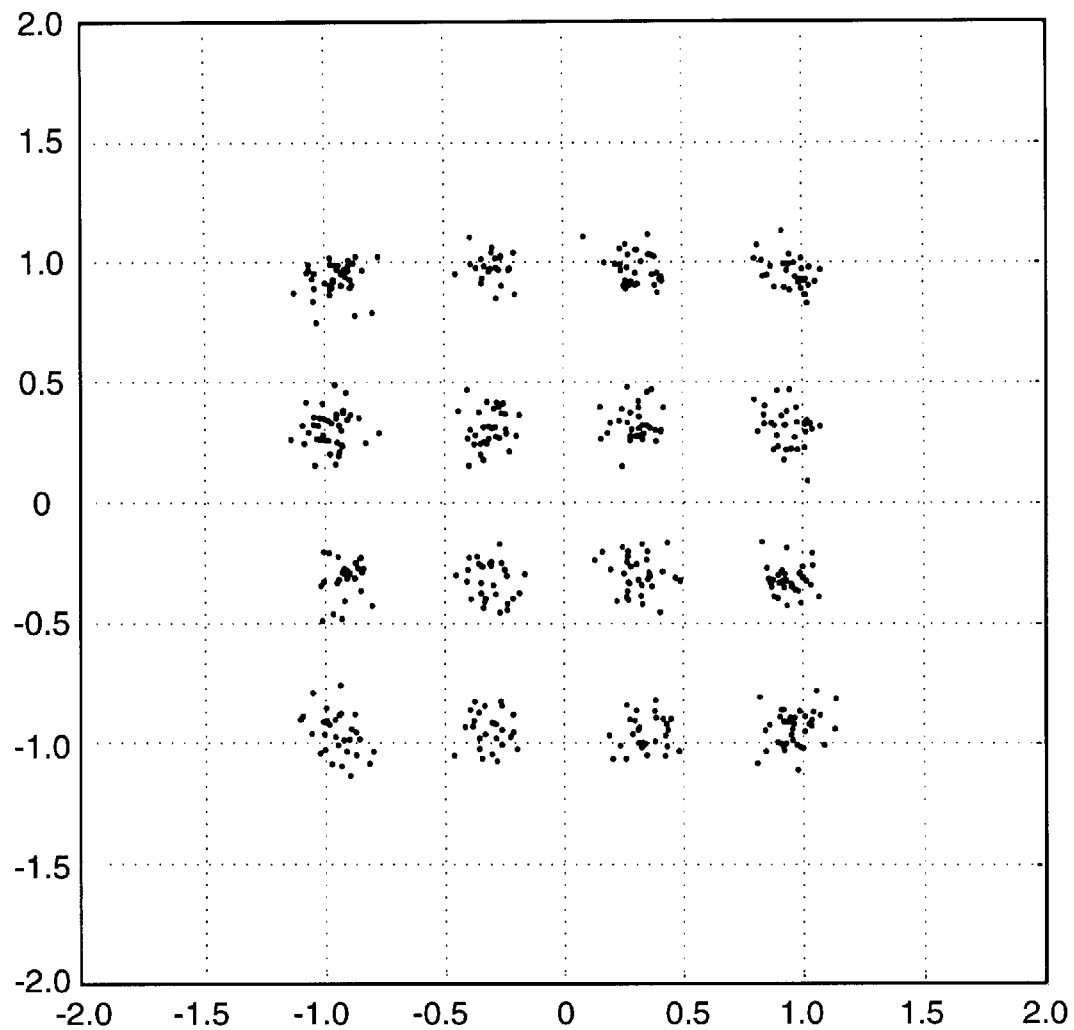
FIG. 4b illustrates simulation results derived from the random phase shift keying architecture of FIG. 3 for phase de-randomized 16 QAM.
Figure 4D:
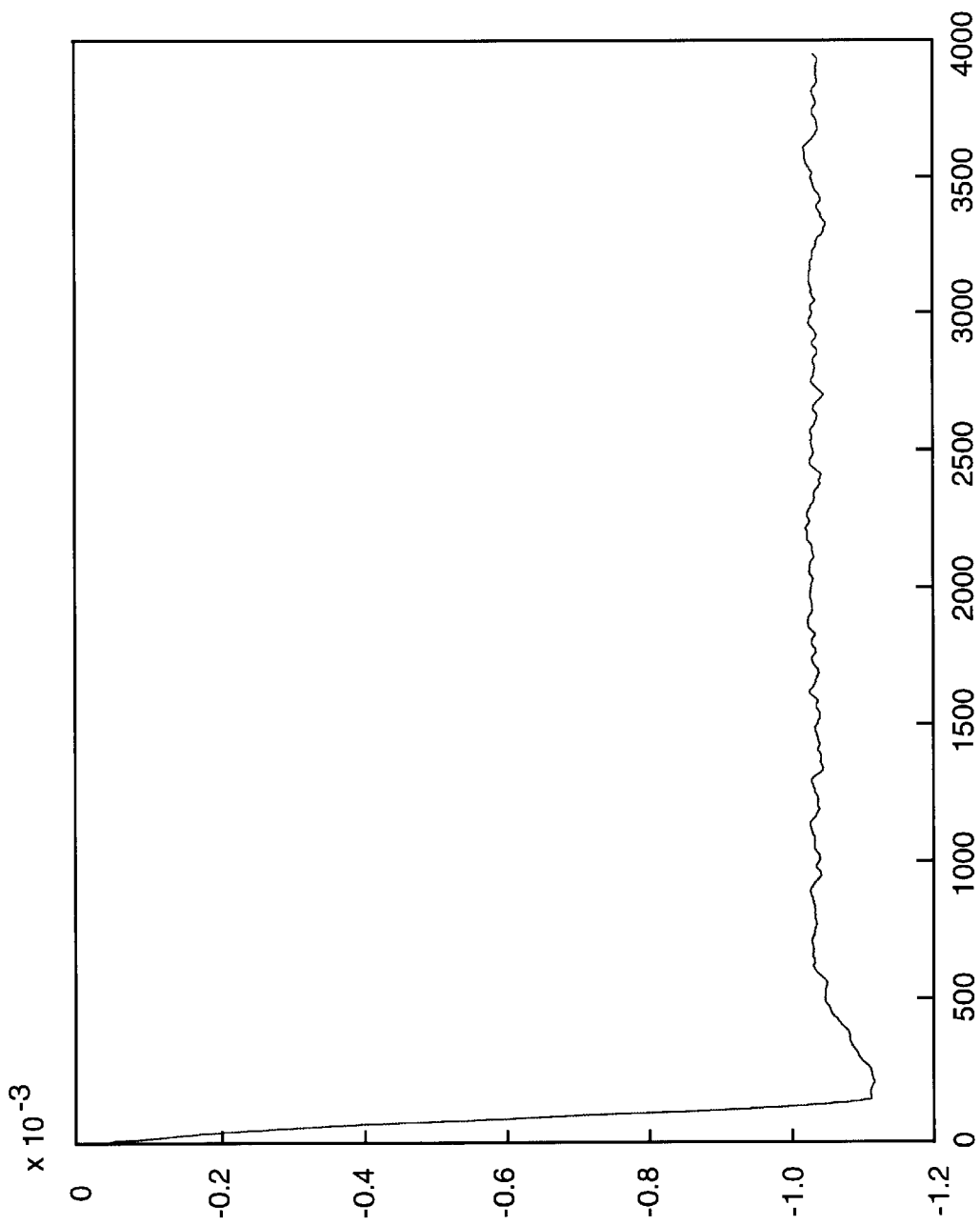
FIG. 4d illustrates simulation results derived from the random phase shift keying architecture of FIG. 3 for VCO frequency with phase de-randomization.

Simulation examples are illustrated in the plots shown in FIGS. 4a–4d which were generated using the processing architecture 10 shown in FIG. 3. FIG. 4a illustrates simulation results derived using the random phase shift keying architecture 10 of FIG. 3 for 16 QAM with no phase de-randomization. FIG. 4b illustrates simulation results derived from the random phase shift keying architecture 10 of FIG. 3 for phase de-randomized 16 QAM. FIG. 4c illustrates simulation results derived from the random phase shift keying architecture 10 of FIG. 3 for VCO frequency without phase de-randomization. FIG. 4d illustrates simulation results derived from the random phase shift keying architecture 10 of FIG. 3 for VCO frequency with phase de-randomization.

FIG. 5 is a flow diagram illustrating an exemplary random phase shift keying communication method 60 in accordance with the principles of the present invention. The communication method 60 comprises the following steps.

Data for transmission is processed 61 by a mapper 12, to produce an APK waveform 12a having a plurality of symbol phases. The APK waveform 12a is mixed 62 with a random phase signal 14 having a random phase sequence to produce a random phase keyed output signal 13a. The random phase keyed output signal 13a is modulated 63 by a vector modulator 30 to produce a modulated random phase keyed output signal 30a. The modulated random phase keyed output signal 30a is mixed 64 with a transmit local oscillator signal to produce modulated carrier signal 15a with a large number of unique phase states. The modulated carrier signal 15a is transmitted 65 over a communication channel 21.

The transmitted modulated carrier signal 15a is received 66. The received modulated carrier signal 15a is mixed 67 with a receive local oscillator signal to produce a estimate of the random phase keyed signal 22a. The estimated random phase keyed signal 22a is synchronously sampled 68 and is mixed 69 with a random phase signal 26 to produce an estimate of the received APK waveform 25a. The estimated APK waveform 25a is then processed 70 by a carrier tracking loop 40 to accurately track the received modulated carrier signal.

Thus, an improved phase shift keying technique that provides for secure modulation of wireless data communication signals has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A communication architecture comprising:

(1) a transmitter comprising:

a data source;

a mapper coupled to the data source that produces an amplitude phase keyed (APK) waveform having a plurality of symbol phases;

a transmitter multiplier for multiplying random phase signals having a random phase sequence with the APK waveform to produce a random phase keyed output signal;

a vector modulator that modulates the random phase keyed output signal to produce a modulated random phase keyed output signal; and a transmitter mixer that mixes the modulated random phase keyed output signal with a local oscillator signal output by a transmit local oscillator to produce a modulated carrier signal having a large number of unique phase states for transmission over a communication channel;

(2) a receiver comprising:

a demodulator comprising a receiver mixer that mixes the received modulated carrier signal with a local oscillator signal derived from a receive local oscillator to produce an estimate of the random phase keyed signal;

a receiver multiplier for multiplying a random phase signal with the estimated random phase keyed signal to produce an estimated APK waveform; and a carrier tracking phase lock loop coupled between the receiver multiplier and the receive local oscillator for processing the estimated APK waveform to track the received modulated carrier signal.

2. The architecture recited in claim 1 wherein the carrier tracking phase lock loop comprises a digital symbol recovery circuit.

3. The architecture recited in claim 2 wherein the digital symbol recovery circuit comprises a slicer for making a decision regarding the estimated APK waveform as to which constellation point was received;

a first angle calculator that determines the estimated phase angle of the constellation point estimated by the slicer;

a second angle calculator for determining the real phase angle of the constellation point in the estimated APK waveform;

a comparator for comparing the phase angles derived from the first and second angle calculators to predicts if the estimated phase angle leads or lags the real phase angle; and a loop filter for processing the output of the comparator to produce a feedback signal that drives the receive local oscillator.

4. A data communication method comprising the steps of:

processing data for transmission to produce an amplitude phase keyed (APK) waveform comprising a plurality of symbol phases;

multiplying the APK waveform with a random phase signal having a random phase sequence to produce a random phase keyed output signal;

modulating the random phase keyed output signal;

mixing the modulated random phase keyed output signal with a transmit local oscillator signal to produce a modulated carrier signal with a large number of unique phase states;

transmitting the modulated carrier signal over a communication channel;

receiving the transmitted modulated carrier signal;

mixing the received modulated carrier signal with a receive local oscillator signal to produce an estimated random phase keyed signal;

synchronously sampling the estimated random phase keyed signal;

multiplying a random phase signal with the estimated random phase keyed signal to produce an estimated APK waveform; and processing the estimated APK waveform to track the received modulated carrier signal.

5. A communication architecture comprising:

(1) a transmitter comprising:

a data source;

a mapper coupled to the data source that produces an amplitude phase keyed (APK) waveform having a plurality of symbol phases;

a transmitter multiplier for multiplying random phase signals having a random phase sequence with the APK waveform to produce a random phase keyed output signal;

a vector modulator that modulates the random phase keyed output signal to produce a modulated random phase keyed output signal; and a transmitter mixer that mixes the modulated random phase keyed output signal with a local oscillator signal output by a transmit local oscillator to produce a modulated carrier signal having a large number of unique phase states for transmission over a communication channel;

(2) a receiver comprising:

a demodulator comprising a receiver mixer that mixes the received modulated carrier signal with a local oscillator signal derived from a receive local oscillator to produce an estimate of the random phase keyed signal;

a receiver multiplier for multiplying a random phase signal with the estimated random phase keyed signal to produce an estimated APK waveform; and a carrier tracking phase lock loop for processing the estimated APK waveform to track the received modulated carrier signal that comprises a digital symbol recovery circuit including:

(a) a slicer for making a decision regarding the estimated APK waveform as to which constellation point was received;

(b) a first angle calculator that determines the estimated phase angle of the constellation point estimated by the slicer;

(c) a second angle calculator for determining the real phase angle of the constellation point in the estimated APK waveform;

(d) a comparator for comparing the phase angles derived from the first and second angle calculators to predicts if the estimated phase angle leads or lags the real phase angle; and (e) a loop filter for processing the output of the comparator to produce a feedback signal that drives the receive local oscillator.

* * * * *